United States Patent Office 2,883,912
Patented Apr. 28, 1959

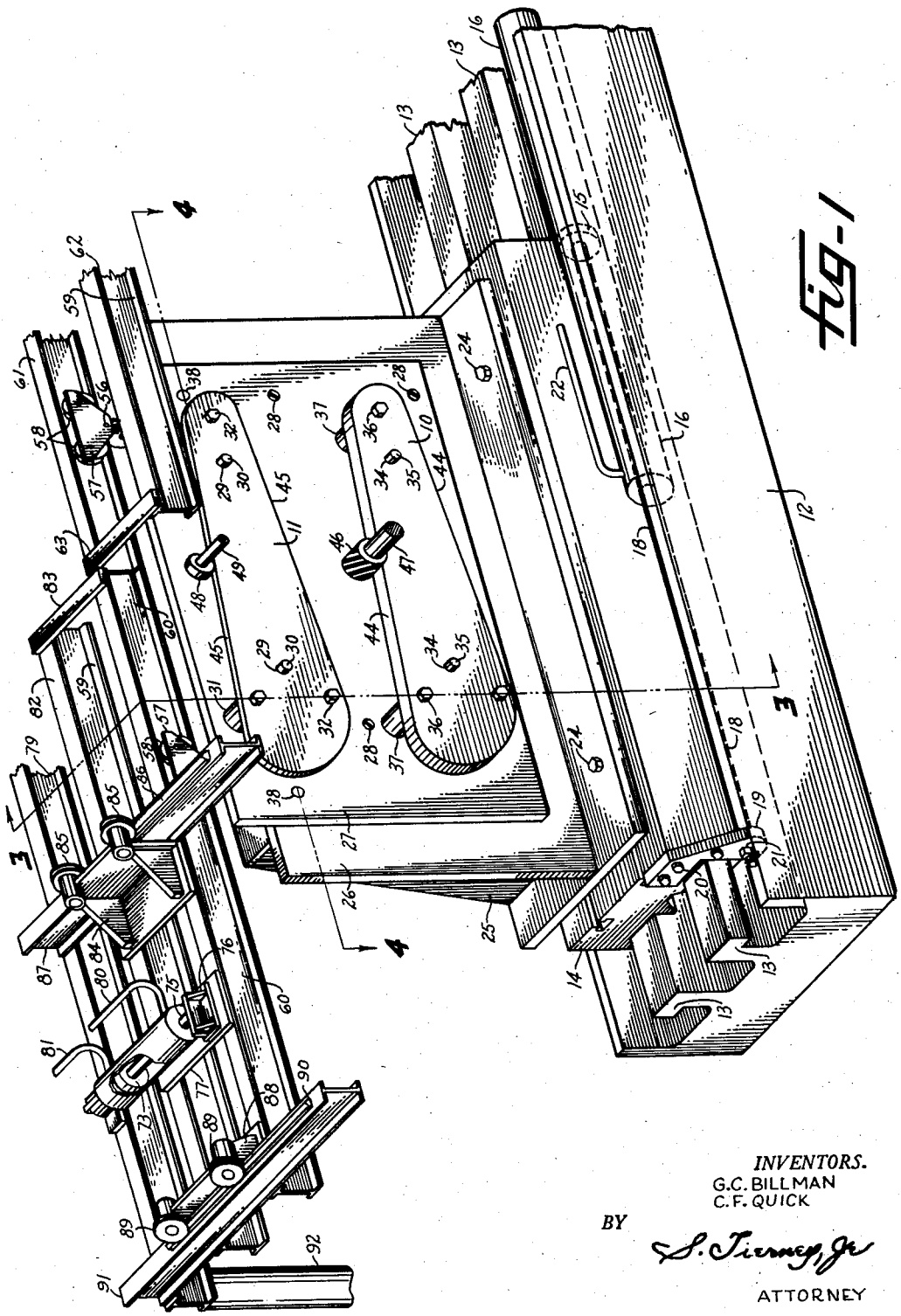

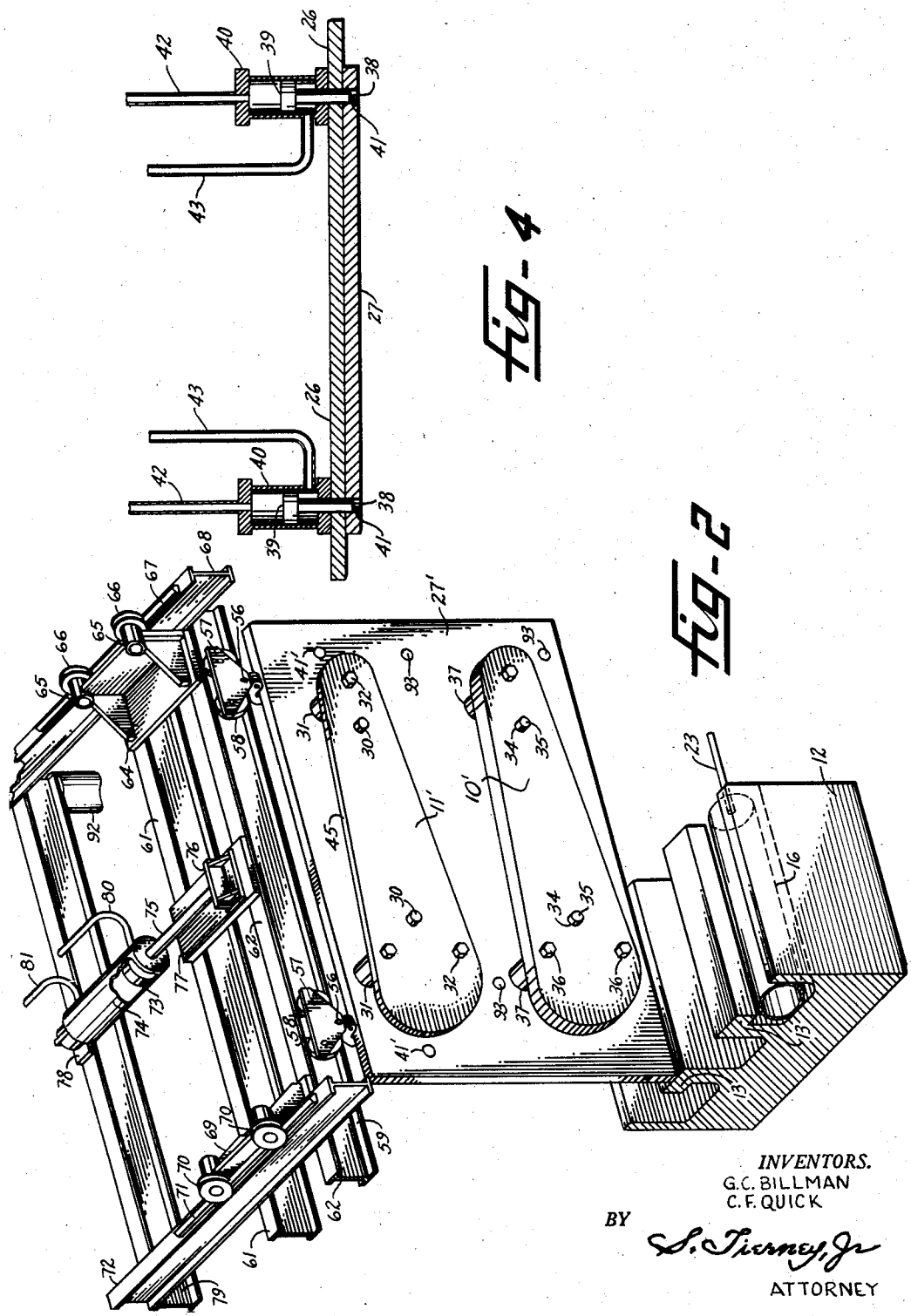

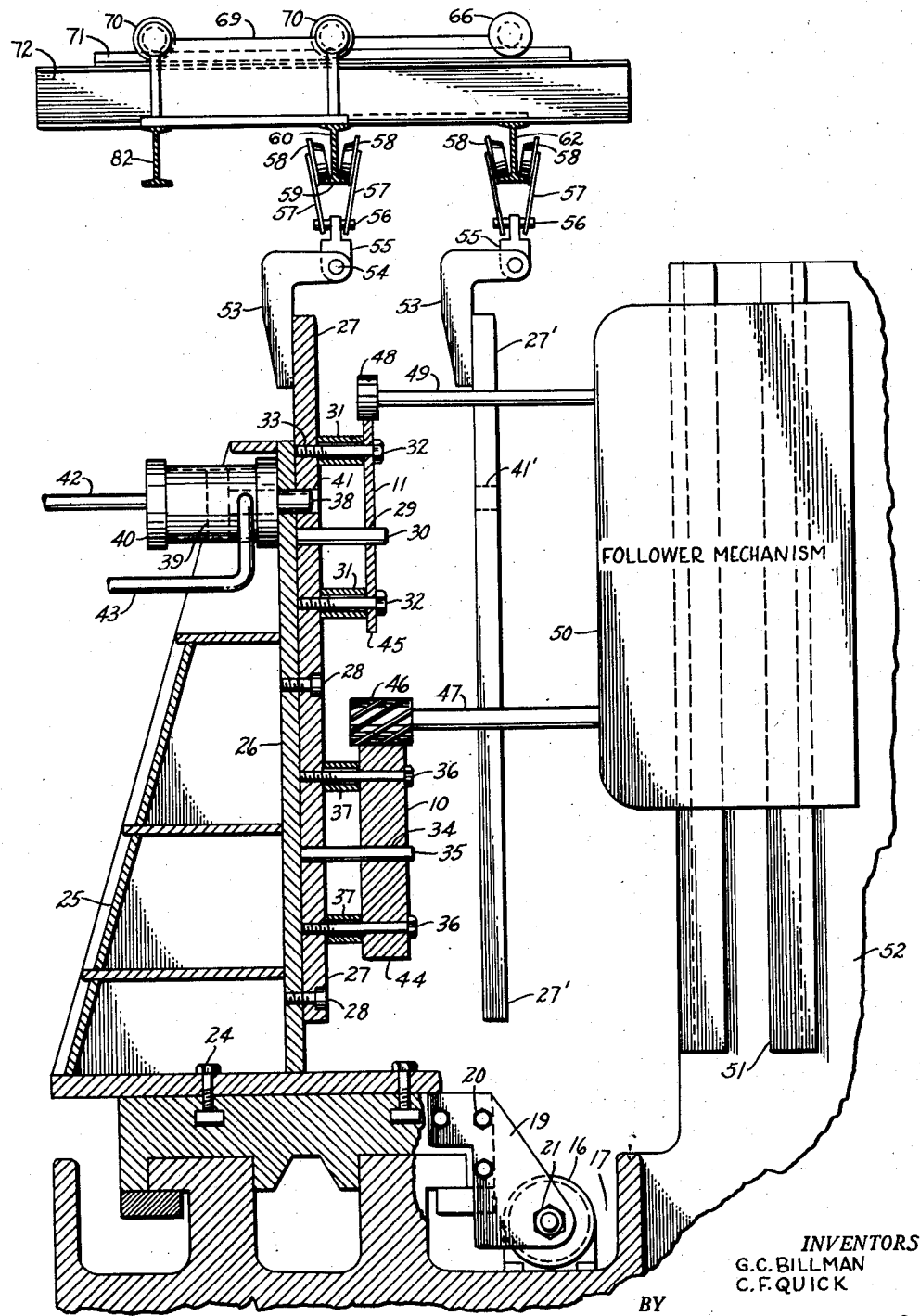

2,883,912

CONVEYOR FOR WORKPIECE AND TEMPLATE

Gerald C. Billman, National City, and Carl F. Quick, Chula Vista, Calif., assignors to Rohr Aircraft Corporation, Chula Vista, Calif., a corporation of California Application January 9, 1956, Serial No. 558,034

1 Claim. (Cl. 90—13)

This invention relates to a conveyor system for transporting a workpiece and template to a cutting machine having a rotary cutter which cuts a face on the workpiece the same shape as the face of the template.

An object of the invention is to provide a conveyor of the type described which will easily and quickly convey the template and workpiece simultaneously to a predetermined position on the cutting machine.

Another object is to provide for attaching the template and workpiece to a substantially vertical support which has indexing means for locating the support at a predetermined position on the cutting machine and also to provide means for easily and quickly securing the support at such position.

A further object is to provide a conveyor system for two workpiece and template supports whereby while the workpiece on one support is being cut, the finished workpiece may be removed from the other and replaced by one which has to be cut to the shape of its template.

Another object is to provide for the suspension of each template and workpiece support on rollers which may easily be rolled along an overhead track by the operator to remove a finished workpiece from the machine and to transfer an unfinished one thereto.

Further objects will become apparent as a description of the conveyor system proceeds. For a better understanding of the invention reference is made to the accompanying drawing, in which:

Figs. 1 and 2 are a view in isometric projection of the conveyor system with some supports omitted and portions of a milling machine;

Fig. 3 is a view partly in section on line 3—3 of Fig. 1 showing portions of the machine and conveyor and, Fig. 4 is a sectional view on line 4—4 of Fig. 1 showing portions of the machine.

The conveyor shown is for transferring a workpiece 10 and template 11 to and from a milling machine having a long base 12 provided with horizontal guideways 13 along which a table 14 is reciprocated by any suitable drive means. The means shown comprises a piston 15 slidable in a stationary cylinder 16 mounted in an open space 17 provided in the top of base 12. The piston is attached to one end of piston rod 18 whose other end passes through a bracket 19 attached by a set of bolts 20 to one end of table 14. The end of piston rod 18 is threaded and a nut 21 screwed thereon secures the piston rod to bracket 19. A pipe 22 connected to one end of the cylinder supplies pressure fluid thereto to slide the piston 15 in one direction and a pipe 23 connected to the opposite end of the cylinder supplies pressure fluid to slide the piston in the opposite direction. Suitable valves (not shown) which do not form part of the present invention, controlled by template 11 control the admission and discharge of pressure fluid into and out of pipes 22 and 23. Secured to the top of table 14 by bolts 24 is a large support 25 whose front consists of a vertical plate 26 constituting a work supporting table of large area. A fixture 27 in the form of a large plate supports the workpiece 10 and template 11, plate 27 being secured to the front of table 26 by any suitable quickly detachable means such as the screws 28.

Indexing means are provided to assure the securing of template 11 and workpiece 10 to fixture 27 at predetermined positions thereon, the indexing means for template 11 consisting of two circular holes 29 through the template adapted to snugly receive the front ends of two cylindrical pins 30 whose rear ends extend into and are tightly secured to fixture 27. The template 11 is preferably spaced from fixture 27 by a plurality of similar sleeves 31 through which pass the headed bolts 32 whose threaded rear ends are screwed into threaded holes 33 in fixture 27. Similarly workpiece 10 is provided with two circular holes 34 which snugly receive the front ends of the cylindrical pins 35 whose rear ends are attached to fixture 27. Headed bolts 36 secure the workpiece in position and the sleeves 37 keep it spaced from the front face of fixture 27.

Indexing means are also provided to locate fixture 27 at a predetermined position on table 26, that illustrated comprising a pair of cylindrical locating pins 38 attached to pistons 39 slidable in the cylinders 40. The front ends of rods 38 are a sliding fit in a pair of circular bores 41 in the fixture 27. Cylinders 40 (Fig. 4) are attached to the rear of table 26 near the top thereof and the pistons 39 may be simultaneously moved forward by admitting pressurized fluid to pipes 42 from a source (not shown) and moved rearward to withdraw the pins 38 from the bores 41 by admitting pressurized fluid to pipes 43. At their extreme front ends the pins 38 taper in as shown to facilitate their entry into the bores 41.

To cut the peripheral face 44 of workpiece 10 to the same shape and size as the peripheral face 45 of template 11, a rotary milling cutter 46 secured to the end of shaft 47 cuts excess metal from the edge of the workpiece, the up and down movement of cutter 46 being controlled by a cylindrical rotary metal tracer 48 which rides along the peripheral face 45 of template 11 as table 14 is reciprocated by piston 15. Tracer 48 is secured to the end of a shaft 49 which is rotatably mounted in a carriage 50 slidable along a vertical guideway 51 formed on a pillar 52 secured to machine base 12. The follower or control mechanism which causes carriage 50 to follow the up and down movement of tracer 48 may be of any known type (not shown), also the electric motor drive for shaft 47 is not shown, not being part of this invention. From the above it will be clear that after the tracer has moved around the entire peripheral face 45 of template 11, the cutter 46 will have cut excess material from the edge of workpiece 10 to leave a substantially smooth peripheral face 44 which is of the same size and shape as template face 45.

A conveyor is provided to transfer the template 11 and workpece 10 to and from the machine, the conveyor comprising a pair of arms 53 which are attached to the top of fixture 27, each arm depending from a pivot pin 54 attached to the lower portion of a block 55. The upper portion of block 55 has a pivot pin 56 the ends of which enter holes provided in the lower ends of a pair of similar plates 57. Pivotally supported at the top of each plate 57 are a pair of rollers 58 adapted to roll along the bottom flanges 59 of the aligned I beams 60, 61. A third I beam 62 the same size as beam 61 is connected parallel to the latter at one end by a plate 63 welded to the beams and the beams are connected at their opposite ends by a bracket 64. The upper end of bracket 64 is provided with a pair of bearings 65 which receive the pivotal supports of a pair of rollers 66 which are adapted to roll along a straight track 67 secured to the top of stationary I beam 68. A second bracket 69 connects the top flanges of beams 61, 62, this bracket having bearings pivotally supporting the rollers 70 adapted to roll along a track 71 which is at the same level as track 67 and parallel thereto. Track 71 is attached to the top of fixed I beam 72 and beams 61, 62 may be moved in a direction transverse to their length by a piston 73 slidable in a cylinder 74. The piston is attached to one end of a piston rod 75, the other end of which is attached to a bracket 76 attached to a plate 77 connecting the beams 61, 62 together. The rear end of cylinder 74 is secured to a bracket 78 which rests on and is fastened to a long fixed I beam 79. Pressurized fluid is supplied to the front end of cylinder 74 by pipe 80 from a suitable source (not shown) or to the rear end of the cylinder by a pipe 81.

Fastened to beam 60 at the rear thereof is an I beam 82 the same size as beam 60 and lying parallel thereto, a plate 83 connecting one end of these beams. A bracket 84 also connects the beams 60, 82, this bracket pivotally supporting a pair of rollers 85 adapted to roll along a track 86 parallel to track 71. Track 86 is secured to the top of an I beam 87 whose rear end rests on and is secured to beam 79. Beams 60 and 82 are also connected by a bracket 88 on which the rollers 89 are pivotally supported, the rollers resting on a track 90 which is parallel to track 86. Track 90 is secured to the top of I beam 91 whose rear end rests on and is secured to beam 79. The ends of beam 79 rest on a pair of supporting columns 92 whose lower ends (not shown) rest on the floor. The front ends of beams 68, 72, 87 and 91 rest on the top of a stationary supporting I beam which is omitted from the drawing for clarity. Beams 60 and 82 are moved forwardly or rearwardly by a second piston 73 and associated parts having the same reference numbers as the similar parts previously described for moving the beams 61—62.

While the workpiece 10 is machined in the manner above described, it and its supporting fixture 27 are being moved behind a second fixture 27' the same shape and size as fixture 27 and having a pair of circular indexing bores 41' similar to and spaced apart the same as the bores 41 in fixture 27. Fixture 27' is supported on beam 62 by a second set of rollers 58 and associated supporting members identical to those previously described for supporting fixture 27. A template 11' the same shape and size as template 11 is attached to fixture 27' by securing means similar to those used for attaching template 11 to fixture 27 and locating pins 30 assure the proper positioning of template 11' on its supporting fixture. While the workpiece 10 is being machined, the operator can attach a second workpiece 10' to fixture 27' by parts similar to those used for attaching workpiece 10 in position. Workpiece 10' is substantially the same shape and size as workpiece 10 before machining and has cylindrical holes 34 to receive the cylindrical locating pins 35 projecting from fixture 27'. After the operator slides workpiece 10' rearwardly along the pins 35, he inserts and tightens the bolts 36 to secure it to fixture 27' in the same position relative to template 11' as the workpiece 10 (before machining) has to template 11.

When the machining of workpiece 10 is complete, the machine is stopped and workpiece 10 removed from the machine and workpiece 10' and template 11' placed therein. This is accomplished by removing the screws 28 and supplying pressurized fluid through pipes 43 to move the pistons 39 rearwardly and thus withdraw the pins 38 from bores 41. Fixture 27 with workpiece 10 and template 11 attached thereto is now moved to the left in Fig. 1, the rollers 58 running along flanges 59 of beams 60 and 61 and supporting the weight of all the parts suspended therefrom. When all these rollers are on beam 60 and the right hand end of fixture 27 is clear of the left hand of plate 26, pressurized fluid is supplied by pipe 81 to the rear of piston 73 to move the beams 60 and 82 forward. The rollers 85 and 89 roll along tracks 86 and 90, supporting the entire weight of these beams and fixture 27 until the right hand end of beam 82 is opposite the left hand end of beam 61. The beams 61 and 62 are then moved rearwardly until the left hand end of beam 62 is opposite the right hand end of beam 82. This is accomplished by admitting pressurized fluid to cylinder 74 of Fig. 2 from pipe 80. Fixture 27' is then pushed toward the left, its weight first being carried by beam 62 and then by beams 62 and 82 as rollers 58 roll along these beams. The fixture is stopped when its bores 41' are in front of indexing pins 38. Pressurized fluid is then supplied to pipes 42 to move the pins and pistons 39 forward, the pins 38 entering the bores 41' and locating fixture 27' at a predetermined position on table 26. Screws 28 are next inserted in the holes 93 in fixture 27' and tightened to fasten fixture 27' to table 26. The machine is now started, the tracer 48 moving along the peripheral face 45 of template 11' and causing the cutter 46 to cut the face 44 of workpiece 10' to the same contour. While this cutting is proceeding, portions of template 11' and workpiece 10' are moving behind fixture 27 so that the operator can remove finished workpiece 10 and replace it by another to be cut to size while the machining of workpiece 10' is proceeding. From the above it is clear that the conveyor system effects a substantial saving in the operator's time and permits a greater number of workpieces to be machined in a given time than if a second fixture and template were not provided.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claim, and all changes which come within the meaning and range of equivalency of the claim are intended to be embraced therein.

Having thus described the invention, what we claim as new and useful and desire to secure by Letters Patent is:

A work table mechanism for a template controlled machine tool comprising, a work supporting table having an upstanding plate; ways slidably supporting said table for horizontal movement; means for moving said table along said ways; a unitary template and workpiece supporting fixture; means supporting and moving said fixture from a loading position to a position in front of said plate and above said table; guide means on said plate to guide said fixture to a predetermined oriented position with respect to said plate; means for detachably securing said fixture to said plate at said predetermined position; a single template having a contoured face secured to said fixture; and means for non-rotatably securing a workpiece to said fixture at a predetermined distance from said template.

References Cited in the file of this patent

UNITED STATES PATENTS

| | | |
|---|---|---|
| 889,368 | Hawley | June 2, 1908 |
| 1,628,245 | Hunter | May 10, 1927 |
| 2,059,505 | Wright | Nov. 3, 1936 |
| 2,526,819 | Henderson | Oct. 24, 1950 |
| 2,782,691 | Feagans | Feb. 26, 1957 |

FOREIGN PATENTS

| | | |
|---|---|---|
| 882,829 | France | Mar. 8, 1943 |

OTHER REFERENCES

Pratt & Whitney, Folder on Keller Machine BG–21, received Div. 13 on Sept. 12, 1955, 12 pages.